United States Patent [19]

Kawashima et al.

[11] Patent Number: 5,705,602
[45] Date of Patent: Jan. 6, 1998

[54] PROCESS FOR THE PRODUCTION OF STAR-LIKE OR COMB-LIKE BRANCHED ALIPHATIC POLYAMINO COMPOUND AND CURABLE RESIN COMPOSITION

[75] Inventors: Miki Kawashima; Takeo Yamaguchi; Toru Kurihashi; Norifumi Watanabe, all of Tokyo, Japan

[73] Assignee: Toyo Ink Manufacturing Co., Ltd., Tokyo, Japan

[21] Appl. No.: 801,027

[22] Filed: Feb. 19, 1997

Related U.S. Application Data

[63] Continuation of Ser. No. 622,143, Mar. 27, 1996, abandoned.

[30] Foreign Application Priority Data

Mar. 31, 1995 [JP] Japan ................. 7-075277

[51] Int. Cl.$^6$ ................. C08G 83/00
[52] U.S. Cl. ................. 528/310; 525/418; 525/451; 525/539; 528/328; 528/331; 528/332; 528/363; 560/155; 560/169; 560/171; 560/215; 564/197
[58] Field of Search ................. 528/310, 328, 528/331, 332, 363; 525/418, 451, 539; 560/155, 169, 171, 215; 564/197

[56] References Cited

U.S. PATENT DOCUMENTS

| | | | |
|---|---|---|---|
| 4,507,466 | 3/1985 | Tomalia et al. | 528/332 |
| 4,758,635 | 7/1988 | Wilson et al. | 525/418 |

Primary Examiner—Richard L. Raymond
Attorney, Agent, or Firm—Wenderoth, Lind & Ponack

[57] ABSTRACT

A star-like or comb-like branched aliphatic polyamino compound for use as a basic catalyst or a curing agent, as an effective thixotropic agent or viscosity adjusting agent for an aqueous medium, as a component for any one of a coating-forming agent, a sealing agent, a molding material and an adhesive resin, or as a substantially solvent-free coating composition, molding material or adhesive resin. The process for the production of the above compound comprises (a) forming an adduct of ammonia or an aliphatic amino compound having an amino group (compound A) with methyl acrylate, adding an alkylenediamine having 2 to 12 carbon atoms to the adduct to carry out an ester-amide exchange reaction (b), thereby obtaining a polyamino compound (B) having a total of 2 to 100 aliphatic primary amino and secondary amino groups per molecule and having a number average molecular weight of 170 to 10,000, and forming an adduct of the polyamino compound (B) with an acrylic acid ester (C) of the formula (1).

$$CH_2=CHCOO-R_1 \quad (1)$$

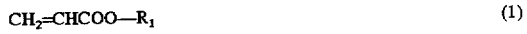

wherein $R_1$ is an alkyl group having 4 to 50 carbon atoms or a group of $(C_nH_{2n}O)_mR_2$ in which $R_2$ is an alkyl group having 1 to 5 carbon atoms, n is an integer of 1 to 3 and m is an integer of 1 to 25.

15 Claims, No Drawings

PROCESS FOR THE PRODUCTION OF STAR-LIKE OR COMB-LIKE BRANCHED ALIPHATIC POLYAMINO COMPOUND AND CURABLE RESIN COMPOSITION

This application is a continuation of application Ser. No. 08/622,143, filed Mar. 27, 1996, now abandoned.

FIELD OF THE INVENTION

The present invention relates to a branched aliphatic polyamino compound having the form of a star or a comb (to be referred to as "star-like or comb-like branched aliphatic polyamino compound" hereinafter) useful as a resin or a curing agent for coating-forming materials such as a coating composition and an ink, a sealing agent, a molding material and an adhesive resin. Further, the present invention relates to a star-like or comb-like branched aliphatic polyamino compound which can be used as a basic catalyst or which can be used as a thixotropic agent or a viscosity adjusting agent when substituents derived from acrylic acid ester are introduced to a small degree since it is water-soluble in this case.

PRIOR ART OF THE INVENTION

Among conventional epoxy curing agents are polyethylenetetramines such as diethylenetriamine and triethyleneamine which are typical aliphatic polyamino compounds. These polyamino compounds are widely used since they undergo curing at room temperature. Generally, however, these polyamino compounds not only have a very short pot life but also have a high vapor pressure, and further, they are greatly irritating to the skin. Most of these polyamino compounds are therefore modified before use in recent years. However, the short pot life is hardly overcome by the modification, and there is caused a fresh problem in that the modified polyamino compounds have an increased viscosity. As a substitute therefor, there have been therefore developed a series of polyetheramines which have a low vapor pressure but have a low viscosity. However, the short pot life has not yet been overcome, and further, a decrease in crosslinking density is inevitable.

In recent years, dendrimers are disclosed as polyfunctional polyamines (U.S. Pat. No. 4,507,466, U.S. Pat. No. 1,558,120 and U.S. Pat. No. 4,435,548). However, when these dendrimers are used as a curing agent for an epoxy resin, they have poor compatibility with the epoxy resin and merely undergo partial gelation.

SUMMARY OF THE INVENTION

It is an object of the present invention to provide a star-like or comb-like branched aliphatic polyamino compound, which has a long pot life, which has a high molecular weight but has a low viscosity and which has excellent compatibility with various resins.

It is another object of the present invention to provide a star-like or comb-like branched aliphatic polyamino compound which can be used as a basic catalyst or a curing agent.

It is further another object of the present invention to provide a star-like or comb-like branched aliphatic polyamino compound which can be used as an effective thixotropic agent or viscosity adjusting agent for an aqueous medium.

It is still further another object of the present invention to provide a star-like or comb-like branched aliphatic polyamino compound which can be used as a component for any one of a coating-forming agent, a sealing agent, a molding material and an adhesive resin.

It is yet another object of the present invention to provide a curable resin composition which can be used as a substantially solvent-free coating composition, molding material or adhesive.

According to the present invention, there is provided a process for the production of a star-like or comb-like branched aliphatic polyamino compound, which comprises (a) forming an adduct of ammonia or an aliphatic amino compound having an amino group (compound A) with methyl acrylate, adding an alkylenediamine having 2 to 12 carbon atoms to the adduct to carry out an ester-amide exchange reaction (b), thereby obtaining a polyamino compound (B) having a total of 2 to 100 aliphatic primary amino and secondary amino groups per molecule and having a number average molecular weight of 170 to 10,000, and forming an adduct of the polyamino compound (B) with an acrylic acid ester (C) of the formula (1),

$$CH_2=CHCOO-R_1 \qquad (1)$$

wherein $R_1$ is an alkyl group having 4 to 50 carbon atoms or a group of $(C_nH_{2n}O)_mR_2$ in which $R_2$ is an alkyl group having 1 to 5 carbon atoms, n is an integer of 1 to 3 and m is a-n integer of 1 to 25.

Further, according to the present invention, there is provided a process for the above production of a star-like or comb-like branched aliphatic polyamino compound, wherein the total of the aliphatic primary amino and secondary amino groups per molecule is increased by carrying out an addition reaction with the methyl methacrylate and the ester-amide exchange reaction at least twice each.

Further, according to the present invention, there is provided a curable resin composition containing the above aliphatic polyamino compound and an epoxy group-containing resin (D).

DETAILED DESCRIPTION OF THE INVENTION

The present inventors have made diligent studies to overcome the above problems, and as a result found the following. There can be obtained a polyamino compound which has a long pot life, which has a low viscosity in spite of its high molecular weight and which has a properly adjusted polarity for having improved compatibility with other resins, by adjusting the amount of an acrylic acid ester which is used for forming an adduct with a polyamino compound having at least 2 amino groups per molecule obtained by forming an adduct of ammonia or an aliphatic amine with methyl acrylate and carrying out a demethanolation (methanol-removing) reaction by an ester-amide reaction in the presence of an alkylenediamine.

In the present invention, the polyamino compound (B) is obtained by (a) forming an adduct of a compound (A) such as ammonia, an aliphatic amine, or the like with methyl acrylate, adding an alkylenediamine having 2 to 12 carbon atoms to the adduct to carry out an ester-amide exchange reaction (b) and optionally (c) repeating the above procedures (a) and (b) at least once. The polyamino compound (B) has a total of 2 to 100 aliphatic primary amino and secondary amino groups per molecule and has a number average molecular weight of 170 to 10,000.

The compound (A) used in the present invention refers to ammonia, or a compound having at least 1 primary amino group or at least 2 secondary amino groups per molecule and having a molecular weight of 30 to 500. The compound (A) includes ammonia, a linear aliphatic amine, an alicyclic amine and an aliphatic aromatic amine.

The above linear aliphatic amine includes alkylmonoamines such as butylamine and dodecylamine, hydrazine compounds such as hydrazine and adipic acid hydrazide, and linear polyamines such as ethylenediamine, propanediamine, butanediamine, propanediamine, pentanediamine, hexanediamine, diaminooctane, diaminodecane, diaminododecane, 2,5-dimethyl-2,5-hexamethylenediamine, polyoxypropylenediamine, diethylenetriamine and triethylenetetramine.

The above alicyclic amine includes 1,8-diamino-p-methane, isophoronediamine, bis(4-amino-3-methyldicyclohexyl)methane, diaminodicyclohexylmethane, 3,9-bis(3-aminopropyl)-2,4,8,10-tetraoxaspyro(5,5)undecane, 1,4-bis(2-amino-2-methylpropyl)piperazine, m-xylenediamine, polycyclohexylpolyamine, bis(aminomethyl)-bicyclo[2,2,1]heptane and methylenebis(furanmethaneamine). The above aliphatic aromatic amine includes α(m-aminophenyl)ethylamine and α(p-aminophenyl)ethylamine.

The reaction for (a) forming an adduct of ammonia or the above amino compound (compound (A)) with methyl acrylate is a Michael addition reaction, and can be carried out by a conventional method. When the above reaction is carried out in the presence of an alcohol such as methanol or ethanol, a side reaction hardly takes place.. When the solvent is used, the amount of the solvent is preferably 1 to 100 times as large as the weight of the compound (A). The above reaction does not specially require heating. When the amino compound (A) has a high molecular weight, it is preferred to heat the reactants at a temperature in the range of from 30° C. to 70° C. Although, depending upon the amino compound and the reaction temperature, the reaction time is preferably 1 to 25 hours.

The ester-amide exchange reaction (b) of the above adduct obtained by procedure (a) and an alkylenediamine having 2 to 12 carbon atoms can be fundamentally carried out according to a conventional method. The alkylenediamine is preferably ethylenediamine. When the alkylenediamine has more than 4 carbon atoms, particularly, 12 carbon atoms, undesirably, the ester-amide exchange reaction is difficult to carry out, and it is required to heat the reactants and/or to add a catalyst. On the other hand, it is preferred to use a large excess of the alkylenediamine based on a reaction product and/or to use an alcohol as a solvent, since the reaction proceeds without causing gelation. Heating is not required in particular, while the reactants may be heated at a temperature in the range of from 30° C. to 80° C. for decreasing the reaction time. For obtaining a reaction product having a single composition, the reaction time is preferably 4 to 100 hours. When a large excess of the alkylenediamine is used, it is preferred to remove the excessive alkylenediamine by distillation.

The polyamino compound (B) used in the present invention can be obtained by the above reactions (a) and (b) (procedures (a) and (b)), while the number of primary amines or secondary amines per molecule can be increased by repeating the above procedures (a) and (b) as required.

The polyamino compound (B) used in the present invention has a total of 2 to 100, preferably 4 to 50, primary and secondary amino groups per molecule. The number of the primary and secondary amino groups per molecule can be increased by repeating the above reactions (a) and (b), while it is difficult, in view of a required time, to produce a polyamino compound having total of at least 50, particularly at least 100, primary and secondary amino groups per molecule.

The number average molecular weight of the polyamino compound (B) used in the present invention is 170 to 10,000, preferably 500 to 5,000. When the above number average molecular weight exceeds 5,000, particularly, 10,000, undesirably, the polyamino compound has a high viscosity or the polyamino compound is a solid so that it is difficult to handle.

Further, polyaminoamide dendrimers in "0th" generation to 4th generation, disclosed in U.S. Pat. No. 4,507,466, U.S. Pat. No. 1,558,120 and U.S. Pat. No. 4,435,548, can be used as a polyamino compound (B). These dendrimers have a spherical form, a high molecular weight and many functional groups so that they can be effectively adjusted in viscosity, polarity and the number of functional groups by introducing an alkyl group.

In the present invention, the acrylic acid ester (C) of the following formula (1) is used for forming an adduct with the above polyamino compound (B) to obtain, as an end product, a star-like or comb-like branched polyamino compound having controlled compatibility and controlled polarity.

$$CH_2=CHCOO-R_1 \qquad (1)$$

wherein $R_1$ is an alkyl group having 4 to 50 carbon atoms or a group of $(C_nH_{2n}O)_mR_2$ in which $R_2$ is an alkyl group having 1 to 5 carbon atoms, n is an integer of 1 to 3 and m is an integer of 1 to 25.

The acrylic acid ester (C) of the formula (1) includes alkyl acrylates having an alkyl group ($R_1$) having 4 to 50 carbon atoms such as 2-ethylhexyl acrylate, butyl acrylate, pentyl acrylate, heptyl acrylate, hexyl acrylate, octyl acrylate, nonyl acrylate, decyl acrylate, undecyl acrylate, dodecyl acrylate, tridecyl acrylate, tetradecyl acrylate, pentadecyl acrylate, hexadecyl acrylate, heptadecyl acrylate, octadecyl acrylate, nonadecyl acrylate, eicosyl acrylate, heneicosyl acrylate and docosyl acrylate. Of these, preferred are acrylates having an alkyl group having 4 to 25 carbon atoms in view of a decrease in viscosity. When the number of carbon atoms of the alkyl group of the acrylic acid ester is 3 or less, it is difficult to produce a polyamino compound having modified compatibility or polarity as an end product. When the number of carbon atoms of the alkyl group of acrylic acid ester exceeds 25, particularly 50, undesirably, the acrylic acid ester shows poor reactivity with the polyamino compound (B), and heating is required for the addition reaction since it is a solid at room temperature. The alkyl group may be any one of a linear alkyl group and a branched alkyl group, while a linear alkyl group is preferred in view of its reactivity with the amino group and a decrease in the viscosity of the star-like or comb-like branched aliphatic polyamino compound as an end product.

The acrylic acid ester (C) further includes tetraethylene glycol acrylate, methoxytetraethylene glycol acrylate, ethoxytetraethylene glycol acrylate, propoxytetraethylene glycol acrylate, n-butoxytetraethylene glycol acrylate, n-pentaoxytetraethylene glycol acrylate, tetrapropylene glycol acrylate, methoxytetrapropylene glycol acrylate, ethoxytetrapropylene glycol acrylate, propoxytetrapropylene glycol acrylate, n-butoxytetrapropylene glycol acrylate, n-pentaoxytetrapropylene glycol acrylate, polyethylene glycol acrylate, methoxypolyethylene glycol acrylate and ethoxypolyethylene glycol acrylate. When an acrylate having a polyoxyalkylene chain having 1 to 25, preferably 3 to 22, repeating units (($C_nH_{2n}O)_m$) as described above is used, there can be obtained a low-viscosity star-like or comb-like branched aliphatic polyamino compound having effectively controlled compatibility and polarity. When the number of the repeating units exceeds 26, undesirably, the polyamino compound as an end product shows poor compatibility with the polyamino compound (B), and heating is required for carrying out the addition reaction.

The star-like or comb-like branched polyamino compound of the present invention can be obtained by a Michael addition reaction between the above polyamino compound (B) and the acrylic acid ester (C). The ratio of the polyamino compound (B) and the acrylic acid ester (C) is determined depending upon the purpose and the compatibility with a resin to be used in combination with the polyamino compound as an end product. For example, when the star-like or comb-like branched aliphatic polyamino compound is used as a catalyst or a modifier, the acrylic acid ester (C) is used in such an amount that molecules of the acrylic acid ester (C) bond to all of primary and secondary amino groups of the polyamino compound (B).

When the star-like or comb-like branched aliphatic polyamino compound is used as a curing agent or a compatibilizing agent for a resin, the polyamino compound (B) and the acrylic acid ester (C) are used preferably in such amounts that the following ratio is satisfied, in view of the reactivity and polarity of the star-like or comb-like branched polyamino compound. When the chemical equivalent of active hydrogen derived from the amino groups of the polyamino compound (B) is 1, the chemical equivalent of the vinyl groups of the acrylic acid ester (C) is 0.02~0.98, preferably 0.1~0.95. When the above chemical equivalent of the acrylic acid ester (C) is smaller than 0.1, particularly 0.02, undesirably, not only it is difficult to effectively control the polarity and compatibility of the star-like or comb-like branched aliphatic polyamino compound, but also the star-like or comb-like branched aliphatic polyamino compound has a considerably high viscosity due to the hydrogen bond of amino groups. When the above chemical equivalent of the acrylic acid ester (C) is greater than 0.95, particularly 0.98, undesirably, the residual ratio of primary or secondary amino groups is too small, and the reactivity of the star-like or comb-like branched aliphatic polyamino compound is low.

The star-like or comb-like branched aliphatic polyamino compound having a number average molecular weight of 200 to 100,000, obtained by the present invention, has a viscosity of 1,000 P or less at 50° C. and has the form of a liquid.

The curable resin composition of the present invention contains the above star-like or comb-like branched aliphatic polyamino compound and an epoxy group-containing resin (D).

The epoxy group-containing epoxy resin (D) includes aromatic epoxy resins such as a bisphenol A type epoxy resin, a bisphenol F type epoxy resin, a bisphenol AD type epoxy resin, a phenol novolak type epoxy resin and cresol novolak type epoxy resin; alicyclic epoxy resins such as alicyclic diepoxy acetal, alicyclic diepoxy adipate, alicyclic diepoxy carboxylate and vinylcyclohexane dioxide; glycidyl ester resins such as diglycidyl phthalate, diglycidyl tetrahydrophthalate, diglycidyl hexahydrophthalate, dimethylglycidyl phthalate and teichoic acid glycidyl ester; glycidylamine resins such as tetraglycidyl aminodiphenylmethane, triglycidyl p-aminophenol, triglycidyl m-aminophenol, diglycidyl aniline and tetraglycidyl bisaminohexane; heterocyclic epoxy resins such as triglycidyl isocyanate, diglycidyl hydantoin and glycidyl glycidoxyalkylhydantoin; and aliphatic epoxy resins such as polyalkylene glycol diglycidyl ether.

The above epoxy group-containing resin (D) has a number average molecular weight of 100 to 50,000, preferably 300 to 1,000. The epoxy group-containing resin (D) having a number average molecular weight in the above range is in the form of a liquid and therefore is easy to handle.

The amount of the epoxy group-containing compound (D) based on the star-like or comb-like branched aliphatic polyamino compound is determined depending upon the reaction equivalent, the field of use and the required performance of the star-like or comb-like branched aliphatic polyamino compound. In general, when the weight of the epoxy group-containing compound (D) is 0.01 to 100 times, preferably 0.1 to 10 times, the weight of the star-like or comb-like branched aliphatic polyamino compound, a curable resin composition gives a cured product having a relatively high elastic modulus. When the amount of the epoxy group-containing compound (D) is smaller than the above lower limit, and when the above amount is larger than the above upper limit, it is difficult to obtain a cured product having a high elastic modulus. Further, in particular, when the amount of the epoxy group-containing compound (D) is too small, undesirably, the cured product by heating shows yellowing to a great extent.

The curable resin composition of the present invention can be used as a substantially solvent-free coating composition, molding material or adhesive resin. On the other hand, for improving the curable resin composition in flowability, etc., water or an organic solvent may be incorporated in a small amount, an amount not exceeding 5% by weight of the curable resin composition. Further, the curable resin composition of the present invention may contain a colorant such as Titanium White or other pigment or a dye and a lubricant.

For improving the curable resin composition in curability, the curable resin composition may contain a crosslinking agent such as a monofunctional or polyfunctional (meth) acrylate monomer, polyisocyanate or melamine.

The curable resin composition of the present invention can be applied onto a plate, a sheet of paper, a film or a sheet of a metal or plastic with any one of a roll coater, a bar coater and a knife coater, and can be cured at a temperature of −5° C. to 300° C.

EXAMPLES

The present invention will be explained in detail with reference to Examples hereinafter, while the present invention shall not be limited to these Examples.

In the Examples, samples were measured for physical properties as follows. The number average molecular weight of a sample having a number average molecular weight of 1,500 or less was obtained by measurement with FD-MAS (a double-focusing spectrometer M-2000, supplied by Hitachi Ltd.). The number average molecular weight of a sample having a higher molecular weight was obtained by preparing a calibration curve of gel permeation chromatograph (GPC) based on molecular weights of substances having equivalent structures, measured with a time-of-flight spectrometer (supplied by Shimadzu Corporation), measuring the sample by GPC and employing the measurements result on the basis of the calibration curve. A sample was measured for viscosity (shear rate=1(/s)) with a rheometer RDS-II (high-viscosity type) or RFS-II (low-viscosity type), supplied by Rheometrix. Further, a sample was measured for viscoelasticity with the passage of time at a predetermined constant temperature with a rheometerRDS-II and the time up to tanδ=1 was taken as the gelation time. A product cured at 200° C. for 10 minutes was measured for elastic modulus at 200° C. with a rheometer RDS-II.

Preparation Example 1

An eggplant type flask having a volume of 200 ml was charged with
6.0 g of ethylenediamine,
34.5 g of methyl acrylate and
40.0 g of methanol,
and the mixture was stirred with a magnetic stirrer at room temperature for 4 hours. Then,
115 g of ethylenediamine
was added to the above reaction system, and the mixture was stirred at 40° C. After 24 hours, excessive ethylenediamine and methanol were distilled off with an evaporator, to give a polyamino compound in the form of a liquid (yield 51.2 g).

Preparation Example 2

An eggplant type flask having a volume of 200 ml was charged with
10.3 g of the polyamine obtained in Preparation Example 1,
13.8 g of methyl acrylate, and
30.0 g of methanol,
and the mixture was stirred with a magnetic stirrer at room temperature for 4 hours. Then,
40.0 g of ethylenediamine
was added to the reaction system, and the mixture was stirred at 40° C. for 48 hours. Then, excessive ethylenediamine and methanol were distilled off with an evaporator, to give a polyamino compound in the form of a liquid (yield 25.3 g).

Preparation Example 3

An eggplant type flask having a volume of 200 ml was charged with
28.5 g of the polyamine obtained in Preparation Example 2,
27.6 g of methyl acrylate, and
60.0 g of methanol,
and the mixture was stirred with a magnetic stirrer at room temperature for 6 hours. Then,
80.0 g of ethylenediamine
was added to the reaction system, and the mixture was stirred at 40° C. for 72 hours. Then, excessive ethylenediamine and methanol were distilled off with an evaporator, to give a polyamino compound in the form of a liquid (yield 52.0 g).

Preparation Example 4

An eggplant type flask having a volume of 200 ml was charged with
20.0 g of diaminododecane,
34.5 g of methyl acrylate, and
40.0 g of methanol,
and the mixture was stirred with a magnetic stirrer at room temperature for 4 hours. Then,
115.0 g of ethylenediamine
was added to the reaction system, and the mixture was stirred at 40° C. for 24 hours. Then, excessive ethylenediamine and methanol were distilled off with an evaporator, to give a polyamino compound in the form of a liquid (yield 63.3 g).

Preparation Example 5

An eggplant type flask having a volume of 200 ml was charged with
10.3 g of diethylenetriamine,
34.5 g of methyl acrylate, and
40.0 g of methanol,
and the mixture was stirred with a magnetic stirrer at room temperature for 4 hours. Then,
115.0 g of ethylenediamine
was added to the reaction system, and the mixture was stirred at 40° C. for 24 hours. Then, excessive ethylenediamine and methanol were distilled off with an evaporator, to give a polyamino compound in the form of a liquid (yield 55.0 g).

Examples 1–45

The polyamino compound (B) obtained in one of Preparation Examples 1 to 5 and methanol were mixed to form a 50 wt % methanol solution. Then, an acrylic acid ester (C) of which the alkyl group had 4, 12 or 18 carbon atoms (each ester will be referred to as "BuA", "DdA" or "OdA" hereinafter) in an amount (reaction equivalent ratio) shown in Table 1 was mixed with the above methanol solution, and the mixture was stirred at 35° C. for 48 hours. Thereafter, the methanol was removed with an evaporator to give a star-like or comb-like branched aliphatic polyamino compound as an end product. Table 1 shows reaction equivalent ratios of polyamino compounds (B) and acrylic acid esters (C) in Examples 1 to 45 and the properties of the star-like or comb-like branched aliphatic polyamino compounds obtained in Examples 1 to 45.

TABLE 1

| Example | (B)* (C) Reaction equivalent ratio | Viscosity/P (Measurement temperature, °C.) | Number average molecular weight |
|---|---|---|---|
| 1 | 1:BuA = 10:1 | 152 (25) | 620 |
| 2 | 1:BuA = 10:5 | 15.7 (25) | 1,020 |
| 3 | 1:BuA = 10:9 | 10.6 (25) | 1,430 |
| 4 | 1:DdA = 10:1 | 105.6 (30) | 1,540 |
| 5 | 1:DdA = 10:5 | 20.6 (30) | 700 |
| 6 | 1:DdA = 10:9 | 3.8 (30) | 1,460 |
| 7 | 1:OdA = 10:1 | 77.9 (30) | 760 |
| 8 | 1:OdA = 10:5 | 10.7 (50) | 1,800 |
| 9 | 1:OdA = 10:9 | 1.1 (50) | 2,840 |
| 10 | 2:BuA = 10:1 | 354 (25) | 1,440 |
| 11 | 2:BuA = 10:5 | 118 (25) | 2,070 |
| 12 | 2:BuA = 10:9 | 24.2 (25) | 3,250 |
| 13 | 2:DdA = 10:1 | 270.4 (30) | 1,800 |
| 14 | 2:DdA = 10:5 | 47.2 (30) | 3,330 |
| 15 | 2:DdA = 10:9 | 8.2 (30) | 4,850 |
| 16 | 2:OdA = 10:1 | 195.6 (30) | 1,940 |
| 17 | 2:OdA = 10:5 | 23.8 (50) | 4,010 |
| 18 | 2:OdA = 10:9 | 2.4 (50) | 6,000 |
| 19 | 3:BuA = 10:1 | 900 (30) | 3,650 |
| 20 | 3:BuA = 10:5 | 303 (25) | 5,200 |
| 21 | 3:BuA = 10:9 | 51.4 (25) | 6,500 |
| 22 | 3:DdA = 10:1 | 600 (30) | 3,700 |
| 23 | 3:DdA = 10:5 | 100 (30) | 6,900 |
| 24 | 3:DdA = 10:9 | 17 (30) | 10,000 |
| 25 | 3:OdA = 10:1 | 430 (30) | 4,200 |
| 26 | 3:OdA = 10:5 | 50 (50) | 8,400 |
| 27 | 3:OdA = 10:9 | 5 (50) | 11,700 |
| 28 | 4:BuA = 10:1 | 170 (50) | 750 |
| 29 | 4:BuA = 10:5 | 80 (50) | 1,150 |
| 30 | 4:BuA = 10:9 | 13 (50) | 1,560 |
| 31 | 4:DdA = 10:1 | 123 (30) | 840 |
| 32 | 4:DdA = 10:5 | 30 (30) | 1,600 |
| 33 | 4:DdA = 10:9 | 5.2 (30) | 2,350 |
| 34 | 4:OdA = 10:1 | 92 (30) | 910 |

TABLE 1-continued

| Example | (B)* (C) Reaction equivalent ratio | Viscosity/P (Measurement temperature, °C.) | Number average molecular weight |
|---|---|---|---|
| 35 | 4:OdA = 10:5 | 13 (50) | 1,940 |
| 36 | 4:OdA = 10:9 | 2.1 (50) | 2,960 |
| 37 | 5:BuA = 10:1 | 180 (50) | 800 |
| 38 | 5:BuA = 10:5 | 89 (50) | 1,300 |
| 39 | 5:BuA = 10:9 | 15 (50) | 1,790 |
| 40 | 5:DdA = 10:1 | 132 (30) | 900 |
| 41 | 5:DdA = 10:5 | 34 (30) | 1,800 |
| 42 | 5:DdA = 10:9 | 6.2 (30) | 2,790 |
| 43 | 5:OdA = 10:1 | 100 (30) | 990 |
| 44 | 5:OdA = 10:5 | 15 (50) | 2,270 |
| 45 | 5:OdA = 10:9 | 2.5 (50) | 3,550 |

Notes:
(B) = Polyamino compound (B); *values show Preparation Example Nos. where the polyamino compounds (B) were obtained.
(C) = Acrylic acid ester (C)

Examples 46–96

Starbust (PAMAM) dendrimers in "0th" generation to 3rd generation (supplied by Aldrich, 20wt % methanol solution) were used as polyamino compounds (B). BuA, DdA, OdA and methoxytriethylene glycol acrylate (to be referred to as "PEG3A" hereinafter) were used as acrylic acid esters (C). One of the Starbust (PAMAM) dendrimers was mixed with BuA, DdA, OdA or PEG3A in a predetermined mixing ratio (reaction equivalent ratio), and the mixture was stirred at 35° C. for 60 hours. Then, the methanol was removed with an evaporator to give a star-like or comb-like branched aliphatic polyamino compound as an end product. Table 2 shows reaction equivalent ratios of polyamino compounds (B) and acrylic acid esters (C) in Examples 46 to 96 and properties of star-like or comb-like branched aliphatic polyamino compounds obtained in Examples 46 to 96.

TABLE 2

| Example | (B)* (C) Reaction equivalent ratio | Viscosity/P (Measurement temperature, °C.) | Number average molecular weight |
|---|---|---|---|
| 46 | 0:BuA = 10:5 | 60.2 (25) | 1,028 |
| 47 | 0:BuA = 10:9 | 13 (25) | 1,438 |
| 48 | 0:BuA = 10:10 | 6.3 (25) | 1,540 |
| 49 | 0:DdA = 10:5 | 22.6 (30) | 1,476 |
| 50 | 0:DdA = 10:9 | 4.2 (30) | 2,224 |
| 51 | 0:DdA = 10:10 | 2.3 (30) | 2,436 |
| 52 | 0:OdA = 10:5 | 14.3 (30) | 1,856 |
| 53 | 0:OdA = 10:9 | 1.5 (50) | 2,856 |
| 54 | 0:OdA = 10:10 | 0.5 (50) | 3,116 |
| 55 | 0:PEG3A = 10:5 | 5.1 (25) | 1,388 |
| 56 | 0:PEG3A = 10:9 | 1.2 (25) | 2,086 |
| 57 | 0:PEG3A = 10:10 | 0.3 (25) | 2,260 |
| 58 | 1:BuA = 10:1 | 362 (25) | 1,441 |
| 59 | 1:BuA = 10:5 | 123 (25) | 2,068 |
| 60 | 1:BuA = 10:9 | 24.5 (25) | 3,271 |
| 61 | 1:BuA = 10:10 | 14.5 (25) | 3,476 |
| 62 | 1:DdA = 10:1 | 275 (30) | 1,812 |
| 63 | 1:DdA = 10:5 | 50 (30) | 3,348 |
| 64 | 1:DdA = 10:9 | 8.5 (30) | 4,884 |
| 65 | 1:DdA = 10:10 | 5.0 (30) | 5,268 |
| 66 | 1:OdA = 10:1 | 200.1 (30) | 1,948 |
| 67 | 1:OdA = 10:5 | 25.0 (30) | 4,028 |
| 68 | 1:OdA = 10:9 | 2.5 (50) | 6,108 |
| 69 | 1:OdA = 10:10 | 1.2 (50) | 6,628 |
| 70 | 1:PEG3A = 10:1 | 27.7 (25) | 1,777 |
| 71 | 1:PEG3A = 10:5 | 12.7 (25) | 3,172 |
| 72 | 1:PEG3A = 10:9 | 1.9 (25) | 4,567 |
| 73 | 2:BuA = 10:1 | 970 (25) | 3,662 |
| 74 | 2:BuA = 10:5 | 310 (25) | 5,300 |

TABLE 2-continued

| Example | (B)* (C) Reaction equivalent ratio | Viscosity/P (Measurement temperature, °C.) | Number average molecular weight |
|---|---|---|---|
| 75 | 2:BuA = 10:9 | 55 (25) | 6,938 |
| 76 | 2:BuA = 10:10 | 37 (25) | 7,348 |
| 77 | 2:DdA = 10:1 | 624 (30) | 4,020 |
| 78 | 2:DdA = 10:5 | 103 (30) | 7,092 |
| 79 | 2:DdA = 10:9 | 17.4 (30) | 10,164 |
| 80 | 2:DdA = 10:10 | 11.2 (30) | 10,932 |
| 81 | 2:OdA = 10:1 | 450 (30) | 4,298 |
| 82 | 2:OdA = 10:5 | 53 (50) | 8,452 |
| 83 | 2:OdA = 10:9 | 6 (50) | 12,612 |
| 84 | 2:OdA = 10:10 | 2 (50) | 13,652 |
| 85 | 2:PEG3A = 10:1 | 60 (25) | 3,950 |
| 86 | 2:PEG3A = 10:5 | 27 (25) | 6,740 |
| 87 | 2:PEG3A = 10:9 | 4 (25) | 9,530 |
| 88 | 2:PEG3A = 10:10 | 2 (25) | 10,228 |
| 89 | 3:BuA = 10:5 | 643 (25) | 11,000 |
| 90 | 3:BuA = 10:9 | 113 (25) | 14,237 |
| 91 | 3:DdA = 10:5 | 212 (25) | 14,580 |
| 92 | 3:DdA = 10:9 | 21.2 (25) | 20,724 |
| 93 | 3:OdA = 10:5 | 8.2 (50) | 17,300 |
| 94 | 3:OdA = 10:9 | 4.0 (50) | 25,620 |
| 95 | 3:PEG3A = 10:5 | 55.6 (30) | 13,876 |
| 96 | 3:PEG3A = 10:9 | 10 (30) | 19,457 |

Notes:
(B) = Polyamino compound (B); *values show generation number of the dendrimers as polyamino compounds.
(C) = Acrylic acid ester (C)

Examples 97–135

The star-like or comb-like branched aliphatic polyamino compounds (X) obtained in Exmaples 19 to 27 were independently mixed with a commercially available epoxy group-containing resin (D)(Epikote 828, bisphenol A type resin, number average molecular weight Mn=365, supplied by Yuka-Shell Epoxy Kabushiki Kaisha) in mixing ratios shown in Table 3. All of the resultant resin compositions were uniform and in the form of a liquid. Table 3 shows the gelation time (GT) of each of the resin compositions obtained in Examples 97 to 115, at a predetermined constant temperature. Table 4 shows the results of measurement of hardness of cured products obtained by heating the resin compositions obtained in Examples 116 to 135 at 200° C. for 10 minutes. The measurement of the hardness of the cured products was conducted at 200° C.

Comparative Example 1

A solvent was distilled off from Starbust (PAMAM) dendrimers in "0th" generation to 3rd generation (supplied by Aldrich, 20 wt % methanol solution), and then the dendrimers were independently mixed with Epikote 828 in a mixing ratio of 1:1 (weight ratio). In this case, no uniform liquid compositions were obtained at 25° C. When the compositions were heated at 30° C., they were partly gelled.

TABLE 3

| Example | Star-like or comb-like branched polyamino compound (X)* | Mixing ratio (X):(D) (D = Epoxy group-containing resin) | Gelation time (minute), (Mesurement temperature: °C.) |
|---|---|---|---|
| 97 | 19 | 1:1 | 10.8 (50) |
| 98 | 19 | 1:1 | 7.1 (80) |
| 99 | 19 | 1:1 | 3.0 (100) |
| 100 | 20 | 1:1 | 410 (30) |
| 101 | 20 | 1:1 | 75.4 (50) |

TABLE 3-continued

| Example | Star-like or comb-like branched polyamino compound (X)* | Mixing ratio (X):(D) (D = Epoxy group-containing resin) | Gelation time (minute), (Mesurement temperature: °C.) |
|---|---|---|---|
| 102 | 20 | 1:1 | 9.3 (80) |
| 103 | 20 | 1:1 | 5.3 (100) |
| 104 | 21 | 1:1 | 870 (30) |
| 105 | 21 | 1:1 | 162 (50) |
| 106 | 21 | 1:1 | 33 (80) |
| 107 | 21 | 1:1 | 13.2 (100) |
| 108 | 22 | 1:1 | 16.4 (50) |
| 109 | 22 | 1:1 | 8.1 (80) |
| 110 | 22 | 1:1 | 3.5 (100) |
| 111 | 24 | 1:1 | 120.0 (40) |
| 112 | 25 | 1:1 | 5.8 (80) |
| 113 | 25 | 1:1 | 3.1 (100) |
| 114 | 25 | 1:1 | 2.0 (100) |
| 115 | 27 | 1:1 | 30 dyas (40) |

Notes:
*Values show Example Nos. where the star-like or comb-like branched aliphatic polyamino compounds were obtained.

TABLE 4

| Example | Star-like or comb-like branched polyamino compound (X)* | Mixing ratio (X):(D) (D = Epoxy group-containing resin) | Hardness after curing (dyn/cm$^2$) (200° C., 10 minutes) |
|---|---|---|---|
| 116 | 19 | 1:1 | 2.8E7 |
| 117 | 20 | 1:0.75 | 3.8E7 |
| 118 | 20 | 1:1 | 3.1E7 |
| 119 | 20 | 1:2 | 2.4E7 |
| 120 | 20 | 1:4 | 1.3E6 |
| 121 | 21 | 1:0.5 | 1.3E7 |
| 122 | 21 | 1:1 | 6.0E7 |
| 123 | 21 | 1:1.5 | 1.5E7 |
| 124 | 21 | 1:3 | 1.8E7 |
| 125 | 23 | 1:1.5 | 1.4E7 |
| 126 | 23 | 1:4 | 1.6E7 |
| 127 | 23 | 1:5 | 8.4E6 |
| 128 | 24 | 1:0.5 | 4.1E7 |
| 129 | 24 | 1:1 | 4.4E7 |
| 130 | 24 | 1:4 | 8.1E6 |
| 131 | 26 | 1:2 | 1.6E7 |
| 132 | 26 | 1:3 | 3.1E7 |
| 133 | 27 | 1:0.5 | 1.3E7 |
| 134 | 27 | 1:1 | 2.0E7 |
| 135 | 27 | 1:1.5 | 4.5E7 |

Notes:
*Values show Example Nos. where the star-like or comb-like branched aliphatic polyamino compounds were obtained.

As explained above, the star-like or comb-like branched aliphatic polyamino compound of the present invention can be used as a resin, a curing agent or a catalyst for coating-forming materials such as a coating composition and an ink and as for a sealing agent, a molding material, an adhesive resin. Further, the star-like or comb-like branched aliphatic polyamino compound of the present invention is water-soluble when substituents derived from acrylic acid ester are introduced to a small degree, and can be therefore used as a thixotropic agent or a viscosity adjusting agent.

In particular, when the amount of the acrylic acid ester is adjusted properly, the star-like or comb-like branched aliphatic polyamino compound of the present invention, although it is an aliphatic polyamino compound, exhibits a long pot life, has a low viscosity in spite of its high molecular weight and exhibits excellent compatibility with other resins.

Further, the curable resin composition of the present invention can be used as any one of a substantially solvent-free coating composition, a molding material and an adhesive resin.

What is claimed is:

1. A branched aliphatic polyamino compound, which is obtained by (a) forming an adduct of ammonia or an aliphatic amino compound having an amino group (compound A) with methyl acrylate, adding an alkylenediamine having 2 to 12 carbon atoms to the adduct to carry out an ester-amide exchange reaction (b), thereby obtaining a polyamino compound (B) having a total of 2 to 100 aliphatic primary amino and-secondary amino groups per molecule and having a number average molecular weight of 170 to 10,000, and forming an adduct of the polyamino compound (B)with an acrylic acid ester (C) of the formula (1),

$$CH_2=CHCOO-R_1 \qquad (1)$$

wherein $R_1$ is an alkyl group having 4 to 50 carbon atoms or a group of $(C_nH_{2n}O)_mR_2$ in which $R_2$ is an alkyl-group having 1 to 5 carbon atoms, n is an integer of 1 to 3 and m is an integer of 1 to 25.

2. A compound according to claim 1, wherein the polyamino compound (B) is a product having a total of 2 to 100 aliphatic primary amino and secondary amino groups per molecule, obtained by carrying out an addition reaction (a) with the methyl acrylate and the ester-amide exchange reaction (b) at least twice each.

3. A compound according to claim 1, wherein the amino compound (A) is ammonia or a compound having at least one primary amino group and/or at least two amino groups per molecule and having a molecular weight of 30 to 500.

4. A compound according to claim 3, wherein the amino compound (A) is at least one member selected from the group consisting of a linear aliphatic amine, an alicyclic amine and an aliphatic aromatic amine.

5. A compound according to claim 1, wherein the adduct is a product obtained by carrying out an addition reaction with the methyl acrylate in an alcohol of which the weight is 1 to 100 times the weight of the amino compound (A).

6. A compound according to claim 1, wherein the polyamino compound (B) is a product obtained by carrying out the ester-amide exchange reaction in the presence of a large excess of the alkylenediamine.

7. A compound according to claim 1, wherein the polyamino compound (B) is a product obtained by carrying out the ester-amide exchange reaction in an alcohol.

8. A compound according to claim 1, wherein the polyamino compound (B) is a polyamino dendrimer.

9. A compound according to claim 1, wherein $R_1$ in the formula (1) is a linear alkyl group.

10. A compound according to claim 1, wherein the adduct of the polyamino compound (B) with the acrylic acid ester (C) is a product obtained by adding the acrylic acid ester (C) in an amount such that the chemical equivalent of vinyl groups of the acrylic acid ester (C) is 0.02–0.98 when the chemical equivalent of active hydrogen derived from the amino groups of the polyamino compound (B) is 1.

11. A compound according to claim 1, wherein the branched aliphatic polyamino compound is as a liquid having a number average molecular weight of 200 to 100,000 and a viscosity of 1,000 poise or less when measured at 50° C.

12. A curable resin composition containing the branched aliphatic polyamino compound of claim 1 and an epoxy group-containing resin (D).

13. A composition according to claim 12, wherein the epoxy group-containing resin (D) is at least one member selected from the group consisting of an aromatic epoxy resin, an alicyclic epoxy resin, a glycidyl ester epoxy resin, a glycidylamine epoxy resin, a heterocyclic epoxy resin and an aliphatic epoxy resin.

14. A composition according to claim 12, wherein the epoxy group-containing resin (D) has a number average molecular weight of 100 to 50,000.

15. A composition according to claim 12, wherein the composition contains the epoxy group-containing resin (D) in an amount which is 0.01 to 100 times as large as the amount of the branched aliphatic polyamino compound.

* * * * *